(No Model.)

G. W. AMOS.
T-SQUARE ATTACHMENT.

No. 530,060. Patented Nov. 27, 1894.

Attest:
Geo. H. Arthur
M. H. Holmes

Inventor:
Geo. W. Amos,
by Robert Burns
Attorney.

THE NORRIS PETERS CO., PHOTO-LITHO., WASHINGTON, D. C.

UNITED STATES PATENT OFFICE.

GEORGE W. AMOS, OF CHICAGO, ILLINOIS.

T-SQUARE ATTACHMENT.

SPECIFICATION forming part of Letters Patent No. 530,060, dated November 27, 1894.

Application filed February 9, 1891. Serial No. 380,823. (No model.)

*To all whom it may concern:*

Be it known that I, GEORGE W. AMOS, a citizen of the United States, residing at Chicago, in the county of Cook and State of Illinois, have invented certain new and useful Improvements in Drawing-Square Attachments; and I do hereby declare the following to be a full, clear, and exact description of the invention, such as will enable others skilled in the art to which it appertains to make and use the same.

This invention relates to an improved attachment to the ordinary T square used in mechanical drafting; the object of the present improvement being to provide a simple, durable and effective attachment to such square, whereby lines at any desired angle, and of exactly opposite obliquity can be drawn with ease, and certainty. I attain such object by the construction and arrangement of parts illustrated in the accompanying drawings, in which—

Figure 1:
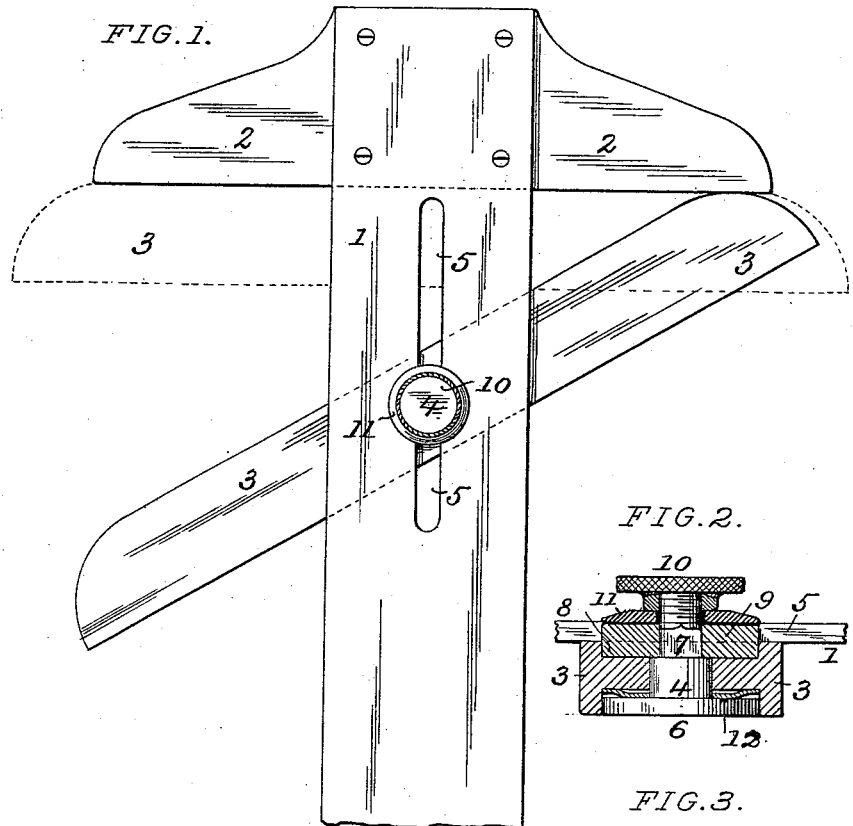
Figure 2:
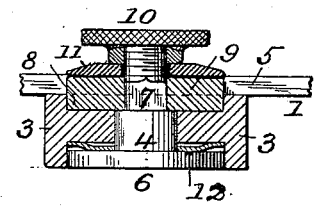
Figure 3:
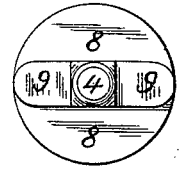

Figure 1, is a plan view of a square, to which my present invention is applied; Fig. 2, an enlarged detail section through the pivot screw, and Fig. 3, an enlarged detail plan of the pivot screw.

Similar numerals of reference indicate like parts in the several views.

Referring to the drawings, 1 represents the drafting blade of a T square having the usual T head 2, fixed to the blade in any usual manner.

In the present improvement, 3 is a bar transverse to the blade 1, to which it is connected by a pivot 4, so as to be capable of a pivotal movement on said blade, with the face of the fixed head 2, as a stop to limit such pivotal movement of said transversely arranged bar 3; said pivot having an adjustable movement in the blade 1, in a direction toward or away from the fixed head 2, of the square, either by arranging said pivot in a slidable manner in an elongated slot 5, in the blade 1, or by an equivalent series of longitudinally arranged holes in the same, in any one of which the pivot can be engaged at will; preference however being given to the first named means, as affording greater range, and a more accurate and delicate adjustment. In this construction the pivot will be formed with a headed circular portion 6, upon which the transverse bar 3, has pivotal movement, an intermediate square shank 7 passing through an intermediate collar 8, that is provided with an elongated spline 9, on top, to fit and slide in the elongated slot 5, of the blade, and a thumb nut 10 and washer 11, to be used in connection therewith to effect the necessary clamping of the parts together, and afford the necessary friction to hold the parts to the required longitudinal adjustment.

12, is a spring washer resting between the head 6, of the pivot, and the face of the recess in the bar 3, in which said head is housed or socketed, the purpose being to afford a light yielding resistance to the free pivotal movement of the said bar in use.

In the practical use of the present device, the forward edge of the bar 3, will rest against the edge of the drawing board, and when pressed fully back against the fixed head 2, (as indicated in dotted lines in Fig. 1) will act in the usual manner as a T head. For drawing lines at any desired angle, one end of the bar 3, will be held against the fixed head 2, and the pivot 4, moved forward in the elongated slot 5, until the desired angle of the blade 1, is attained, when the parts will be clamped to such required longitudinal adjustment by the thumb nut 10. As so arranged the angularity of the blade 1, can be duplicated in an exactly opposite obliquity by swinging such blade upon the pivot 4, until the fixed head 2, comes to a stop against the other end of the bar 3.

My device is of especial value in drawing in angular perspective, for pattern makers' use in laying out the "draft" of patterns, as well as in other special instances too numerous to mention.

A marked advantage arising from my improvement is that the blade of the square does not require to be reversed or turned over in drawing obliquely arranged lines, thus saving the sheet of drawing from being soiled by the dust and grime, that naturally accumulates on the top of the blade in use.

Having thus fully described my said invention, what I claim as new, and desire to secure by Letters Patent, is—

1. The combination with the blade and fixed head of a drafting square, of a transverse bar having pivotal movement midway of its length and that of the fixed head, and on the under side of the blade, with either of its free ends adapted to come to a stop against the fixed head in the use of the square, substantially as described.

2. The combination with the blade and fixed head of a drafting square, of a transverse bar having pivotal movement midway of its length and that of the fixed head, and on the under side of the blade, with either of its free ends adapted to come to a stop against the fixed head in the use of the square and means for effecting an adjustment of the pivot point, in a direction to and from the fixed head, substantially as set forth.

3. The combination with the blade and fixed head of a drafting square, of a transverse bar having free pivotal movement midway of its length and that of the fixed head, and on the under side of the blade, with either of its free ends adapted to come to a stop against the fixed head in the use of the square, and made adjustable to and from the fixed head by means of an elongated slot 5, in the blade, and a clamping screw and nut, substantially as set forth.

4. The combination with the blade and fixed head of a drafting square, of a transverse bar having free pivotal movement on the under side of the blade, and made adjustable to and from the fixed head by means of an elongated slot 5, in the blade, and a clamping screw and nut, the screw consisting of a headed circular portion 6, a squared shank 7, and an intermediate washer 8, having a spine 9, on top, substantially as set forth.

In testimony whereof I affix my signature in presence of two witnesses.

GEORGE W. AMOS.

Witnesses:
ROBERT BURNS,
GEO. W. ARTHUR.